(12) United States Patent
Trevor et al.

(10) Patent No.: US 8,886,707 B2
(45) Date of Patent: Nov. 11, 2014

(54) INTERVENTION PROCESSING OF REQUESTS RELATIVE TO SYNDICATION DATA FEED ITEMS

(75) Inventors: Jonathan James Trevor, Santa Clara, CA (US); Daniel Joseph Raffel, San Francisco, CA (US); Pasha Sadri, Menlo Park, CA (US); Edward Ho, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 667 days.

(21) Appl. No.: 11/611,648

(22) Filed: Dec. 15, 2006

(65) Prior Publication Data

US 2008/0147780 A1 Jun. 19, 2008

(51) Int. Cl.
*G06F 15/16* (2006.01)
*G06F 17/30* (2006.01)
*H04L 29/08* (2006.01)

(52) U.S. Cl.
CPC .... *G06F 17/30876* (2013.01); *G06F 17/30893* (2013.01); *H04L 67/02* (2013.01); *H04L 67/26* (2013.01); *G06F 17/3089* (2013.01)
USPC ........... 709/203; 709/205; 709/206; 709/217; 709/219; 705/14.4; 705/14.49; 705/14.5; 705/14.51; 705/14.53

(58) Field of Classification Search
USPC ......... 709/203, 206, 207, 217, 219; 705/14.4, 705/14.49
See application file for complete search history.

(56) References Cited

U.S. PATENT DOCUMENTS

| 2003/0191816 | A1 | 10/2003 | Landress et al. | |
|---|---|---|---|---|
| 2005/0033657 | A1* | 2/2005 | Herrington et al. | 705/26 |
| 2005/0114198 | A1 | 5/2005 | Koningstein et al. | |
| 2005/0144305 | A1 | 6/2005 | Fegan et al. | |
| 2005/0165615 | A1* | 7/2005 | Minar | 705/1 |

(Continued)

FOREIGN PATENT DOCUMENTS

| WO | WO01/69428 | 9/2001 |
|---|---|---|
| WO | WO2005/065237 | 7/2005 |

(Continued)

OTHER PUBLICATIONS

U.S. Appl. No. 11/550,307, filed Oct. 17, 2006.

(Continued)

*Primary Examiner* — Liangche A Wang
*Assistant Examiner* — Cheikh Ndiaye
(74) *Attorney, Agent, or Firm* — Weaver Austin Villeneuve & Sampson LLP

(57) ABSTRACT

Syndication data feed items, corresponding to hosted content, are provided to a user program. A resource locator to hosted content to which a syndication data feed item corresponds is processed, including adjusting the resource locator to associate the resource locator with an intervention service with regard to the syndication data feed item. The processed syndication data feed items are provided to the user program. In addition, requests are processed to view hosted content corresponding to syndication data feed items. An intervention service receives a request from a user program to view hosted content to which a syndication data feed item corresponds, including a resource locator to the host that has been adjusted in the syndication data feed item to associate the resource locator with an intervention service. Intervention processing is performed, including causing interaction with the host of the requested content such that the host content is caused to be displayed at a user location.

39 Claims, 5 Drawing Sheets

(56) References Cited

U.S. PATENT DOCUMENTS

| | | |
|---|---|---|
| 2005/0216516 A1 | 9/2005 | Calistri-Yeh et al. |
| 2005/0267973 A1 | 12/2005 | Carlson et al. |
| 2005/0289147 A1 | 12/2005 | Kahn et al. |
| 2006/0026067 A1 | 2/2006 | Nicholas et al. |
| 2006/0085259 A1 | 4/2006 | Nicholas et al. |
| 2006/0095507 A1* | 5/2006 | Watson .......................... 709/203 |
| 2006/0167749 A1 | 7/2006 | Pitkow et al. |
| 2006/0173985 A1 | 8/2006 | Moore |
| 2006/0206584 A1 | 9/2006 | Hyder et al. |
| 2006/0242663 A1 | 10/2006 | Gogerty |
| 2006/0282312 A1 | 12/2006 | Carlson et al. |
| 2007/0038643 A1 | 2/2007 | Epstein |
| 2007/0055748 A1 | 3/2007 | Kim et al. |
| 2007/0061311 A1 | 3/2007 | Kurose |
| 2007/0078714 A1 | 4/2007 | Ott et al. |
| 2007/0083468 A1 | 4/2007 | Wetherell |
| 2007/0083894 A1 | 4/2007 | Gonsalves et al. |
| 2007/0094082 A1 | 4/2007 | Yruski et al. |
| 2007/0094083 A1 | 4/2007 | Yruski et al. |
| 2007/0094391 A1* | 4/2007 | Nussey .......................... 709/225 |
| 2007/0150343 A1 | 6/2007 | Kannapell et al. |
| 2007/0174255 A1 | 7/2007 | Sravanapudi et al. |
| 2007/0174340 A1 | 7/2007 | Gross |
| 2007/0299935 A1* | 12/2007 | Plastina et al. ................ 709/219 |
| 2008/0065737 A1 | 3/2008 | Burke et al. |
| 2008/0091521 A1 | 4/2008 | Ho et al. |
| 2008/0244091 A1 | 10/2008 | Moore et al. |
| 2008/0288640 A1 | 11/2008 | Trevor et al. |
| 2009/0172547 A1 | 7/2009 | Sparr |

FOREIGN PATENT DOCUMENTS

| | | |
|---|---|---|
| WO | WO2005/098675 | 10/2005 |
| WO | WO2005/114525 | 12/2005 |
| WO | WO2006/076424 | 7/2006 |
| WO | WO2006/083958 | 8/2006 |

OTHER PUBLICATIONS

Smith, Steve; "Tapping the Feed: in search of an RSS Money Trail" Econtent; Mar. 2005; vol. 28; Issue 3; p. 30-34.
Krol, Carol; "RSS ad programs feed needs" B to B; Jul. 11, 2005; vol. 90 Isue 9; p. 1-33.
http://web.archive.org/web/20060208061851/www.amazon.com/gp/browse.html? encoding=UTF8&node=3434671&no=3435361&me=A36L942TSJ2AJA.
Non-Final Office Action dated Aug. 5, 2009, from U.S. Appl. No. 11/550,307.
Final Office Action dated Mar. 16, 2010, from U.S. Appl. No. 11/550,307.
Non-Final Office Action dated Jul. 8, 2010, from U.S. Appl. No. 11/550,307.
Nagano, H.; "New Web Marketing with RSS" Web Designing, vol. 5, No. 12, Japan Dec. 1, 2005, pp. 102-105.
Chinese First Office Action dated Mar. 29, 2011 from CN200780038865.5.
EP Search Report dated Jan. 24, 2011 from EP07844299.3.
Japanese Office Action dated May 30, 2011 from JP2009-533463.
Japanese Office Action dated Oct. 24, 2011 from JP2009-533463.
Korean Office Action dated Feb. 16, 2011 from KR10-2009-7010073.
Korean Office Action dated Nov. 20, 2011 from KR10-2009-7010073.
Final Office Action dated Dec. 13, 2010, from U.S. Appl. No. 11/550,307.
Non-Final Action dated May 26, 2011, From U.S. Appl. No. 11/550,307.

* cited by examiner

INTERVENTION PROCESSING OF REQUESTS RELATIVE TO SYNDICATION DATA FEED ITEMS

BACKGROUND

Subscribing to web site syndication feeds is a popular mechanism for users to receive information about web pages in an efficient manner. In general, syndication data for a web page is data that represents the content of the web page and may even be identical in content to the content of the web page, but is not itself the content of the web page. The syndication data is available to syndication-aware programs that subscribe to a "feed" of the syndication data. The syndication data is typically designed to be machine-readable for efficient processing (e.g., into human-readable form). For example, the syndication data is typically XML-based or otherwise structured to ensure or enhance the machine-readability.

A typical use of syndication data is by subscription via a syndication feed aggregation service, which combines the contents of multiple syndication feeds for display on a single screen or series of screens. Examples of syndication data include data formatted according to standards such as past, current and to-be promulgated versions of RSS and Atom. While RSS and Atom are popular syndication data formatting standards, there are (and, in high probability, will be) other standards for syndication data formatting.

The syndication feed content for a data item typically includes a human-readable description of the data item, where the human-readable description is "clickable" to the web page URL so that the user can easily view the corresponding underlying web page content. In addition, many aggregation programs are configured to display advertising in conjunction with the display of syndication feed content. Thus, for example, the syndication feed aggregation service provider may earn money each time a user clicks on an advertisement.

SUMMARY

In accordance with one aspect, the invention may include a method to provide syndication data feed items to a user program. The syndication data feed items correspond to hosted content. For each of a plurality of syndication data feed items, a resource locator to hosted content to which that syndication data feed item corresponds is processed. The processing includes adjusting the resource locator to associate the resource locator with an intervention service with regard to the syndication data feed item. The processed syndication data feed items are provided to the user program.

In accordance with another aspect, the invention may include a method to process requests to view hosted content corresponding to syndication data feed items. An intervention service receives a request from a user program to view hosted content to which a syndication data feed item corresponds. The request includes a resource locator to the host that has been adjusted in the syndication data feed item to associate the resource locator with an intervention service with regard to the syndication data feed item. The intervention service performs intervention processing with respect to the syndication data feed item of the request and causes interaction with the host of the requested content such that the host content is caused to be displayed at a user location.

DETAILED DESCRIPTION

The inventors have realized that is desirable to observe and/or act upon a user activating a syndication feed data item. For example, a feed aggregator program may be able to monetize these activations or otherwise improve user experience relative to use of the feed aggregator (which can indirectly result in improved revenue, e.g., by attracting more users to the feed aggregator, which can result in higher advertising revenue) or even relative to other services provided by or otherwise associated or affiliated with the feed aggregator.

In accordance with an example, the aggregation service adjusts the locator (typically, a universal resource locator, or URL) of a syndication data feed item subscribed to by, and presented to, a user. When the syndication data feed item is activated by the user, an intervention service is notified of the activation as a result of the locator being adjusted. In this way, the intervention service can take an intervention action in association with the activation. The intervention service is configured such that a desired action can be taken in conjunction with causing the hosted content corresponding to the syndication data feed item to be provided to the user.

Figure 1:
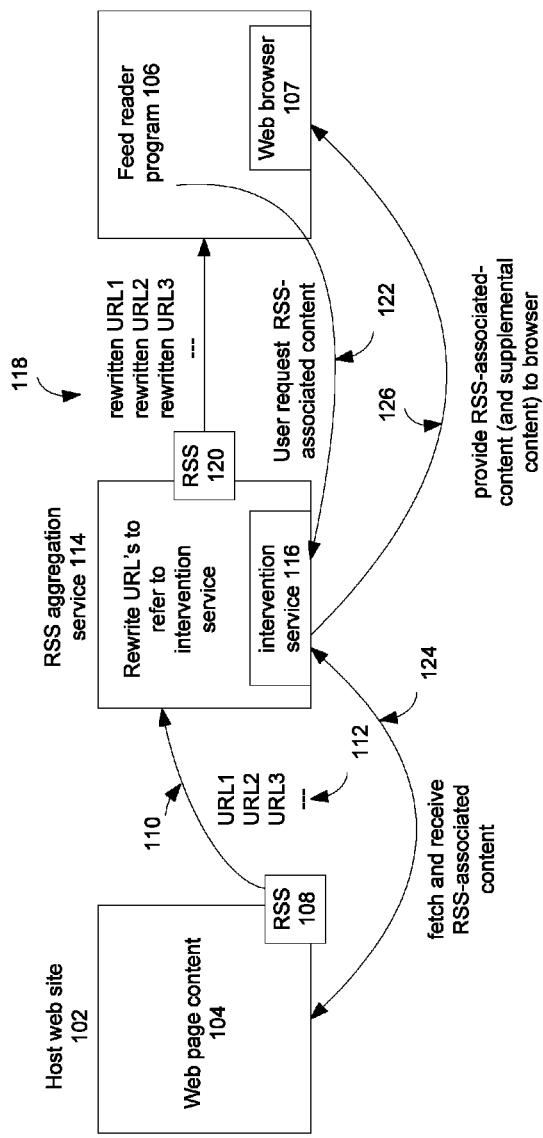
FIG. 1 is a block diagram illustrating an example architecture of a system in which the locator of a syndication data feed item is adjusted to correspond to an intervening service. The intervening service retrieves content corresponding to the syndication data feed item and provides the retrieved content to a user.

FIG. 1 is a block diagram illustrating an example architecture of a system in which the locator of a syndication data feed item is adjusted. Referring to FIG. 1, a host web site 102 is configured to provide web content 104 based on a request from, for example, a web browser program 107. While FIG. 1 illustrates a single host web site 102, in a typical configuration, the system may include more (even many more) than a single host web site 102 configured to provide web content to the feed reader program 106 (which may be, for example, integrated as part of a web browser or other program, or a standalone program). A single host web site 102 is shown for simplicity of illustration only. Typically, a feed reader program 106 provides a user interface in which indications of syndication data feed items are displayed and, as a result of a user clicking on a portion of the display, an appropriate request is provided to a host web site.

The host web site 102 has associated with it an RSS module 108 (which, more generically, includes functionality to cause a syndication data feed to be provided). The RSS module 108 operates to cause an RSS feed 110 to be provided to an RSS aggregation service 114. In particular, the RSS feed 110 comprises a structured representation of the web site content 104, including locators 112 (in FIG. 1, URL1, URL2 and URL3) usable to form a request for particular portions of the web site content 104.

The RSS aggregation service 114 (or, in some examples, functionality associated with the RSS aggregation service, which may be a separate service) is configured to rewrite the locators 112 to include location information of an intervention service 116 which may be, for example, closely associated with the RSS aggregation service 114. The rewritten locators 118 are provided via an RSS module 120 output of the aggregation service 114 to the feed reader program 106 and, for example, indications of the RSS feeds are caused to be displayed by the feed reader program 106. For example, the aggregation service 114 may be part of a service known as MyYahoo®, which can provide a user-configurable web page including information corresponding to RSS feeds subscribed to by the MyYahoo® user.

In accordance with some examples, in addition to or instead of adjusting the locators of the RSS syndication feed items, the aggregation service adjusts the syndication data feed items to include one or more beacons, such that user behavior relative to viewing the syndication data feed item may be monitored using, for example, a feed reader program.

While the discussion herein is in terms of "programs," it is noted that, in some examples, the described functionality may be accomplished by hardware, software, or some combination of both. The programs may be carried out by at least one computing device executing computer program instructions that are stored in at least one computer readable medium.

The user, using the feed reader program 106 to view the display including the indication of the RSS feeds, may activate one or more of the RSS feed item indications to cause a request 122 corresponding to the RSS feed item to be provided from the feed reader program 106. More particularly, the request is provided to a location indicated by a locator received by feed reader program 106 in association with the activated RSS feed item indication. As discussed earlier, the locator has been adjusted to point to the intervention service 116. In general, the adjusting is such that the original information in the locator is preserved.

For example, the URL http://somewhere.com/story23.htm may be adjusted to http://intervention.com?=http://somewhere.com/story23.htm. The use of the "?=" is a one way to provide a parameter to the location indicated by the URL. That is, in the example, the URL is http://intervention.com (the location of the intervention service 116) and the parameter provided to the intervention service 116 is http://somewhere.com/story23.htm.

There are many other ways to provide the parameter. Furthermore, the parameter may even have been encoded by the RSS aggregation service 114 such that, for example, the encoded parameter is not readable by a user of the RSS feed program. In this case, the parameter would be decoded at the intervention service 116.

Continuing on with the FIG. 1 example, using the original location information for the requested content associated with an RSS feed, the intervention service 116 interoperates with the host web site 102 to request and receive 124 the appropriate portion of the web content 104. The intervention service 116 provides 126 the received web content 104 to be displayed to the user (e.g., by a web browser program 107). In some sense, then, in one example, the intervention processing may be thought of as a proxy that facilitates interoperation between an RSS-enabled web site (more generally, a web site that is enabled to provide a syndicated data feed) and a feed reader and/or web browser.

In addition, the intervention service 116 may be configured to provide and/or cause intervention operations associated with the request for the content associated with the RSS feed. Operations may include, for example, tracking requests to view hosted content based on syndication data feed items (and, e.g., correlating the activations with characteristics of the users causing the requests to be made). Such tracking may provide useful information for targeted marketing, for example.

In general, the intervention operations may depend on or be a function of the identity of the requesting user and/or characteristics associated with the requesting user. The identity of the requesting user may be available to the intervention operations via a cookie or some other means. Knowing the identity of the requesting user, it may be possible to identify characteristics associated with the requesting user.

Figure 5:
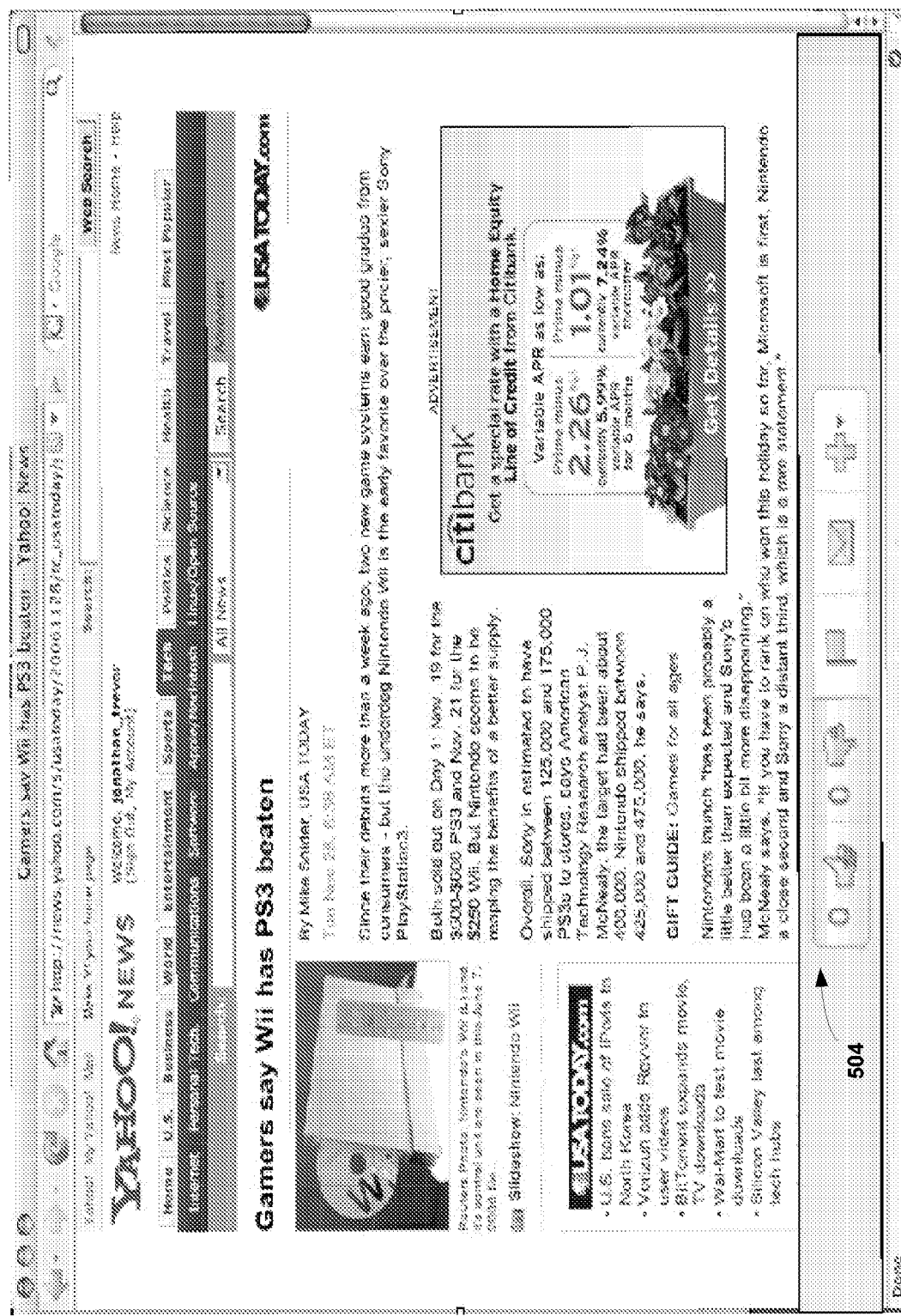
FIG. 5 illustrates an example in which requested content associated with a syndication data feed item is displayed, and additional information is also caused to be displayed.

Another example of intervention operations may include causing additional information, other than the requested content associated with a syndication data feed item, to be displayed to the user. FIG. 5 illustrates an example in which requested content 502 associated with a syndication data feed item is displayed, and additional information 504 is also caused to be displayed. Such additional information may include, for example, information associated with the requested content, such as ratings of the requested content (e.g., by other users). A fillable form or other interface may be caused to be displayed to the user to, for example, solicit and receive feedback from the user, such as regarding the requested content. The additional content 504 illustrated in FIG. 5 includes a "thumbs up" and "thumbs down" graphical user interface item via which a user may provide feedback. In some examples, the intervention operations include statistic collection regarding the requested content and/or regarding the requesting user.

In some examples, advertising or other material (e.g., relevant to the requested content) may be caused to be displayed to the user. For example, such material may be caused to be displayed based on characteristics of the user and/or characteristics of the activated syndication data item. With respect to characteristics of the activated syndication data item, in some examples, as the syndication data item passes through the RSS aggregation service 114 from the RSS feed 110 to the RSS 120 module output, RSS data items are analyzed and the results of the analysis are saved in association with an indication of the syndication data item (e.g., in association with an indication of the original URL or other locator associated with the syndication data item).

When a request is made for web site content corresponding to a syndicated data item, the aggregation service 114 can access the saved analysis and correlate the analysis results to the request. In this manner, advertisements or other material can be displayed in conjunction with the requested content based on the results of the previously carried out analysis. See, for example, U.S. patent Ser. No. 11/550,307, entitled SUPPLEMENTAL DISPLAY MATCHING USING SYNDICATION INFORMATION, filed Oct. 17, 2006 and incorporated herein by reference for all purposes, for a discussion of processing syndication data to determine supplemental content, such as advertising, to be displayed in association with the content of a web site corresponding to the syndication data.

In some examples, the analysis used to correlate the RSS data item, for which content is requested, with material to be displayed in conjunction with the requested content is carried out at the time the content is requested. For example, the request (such as 122 in FIG. 1) may provide enough information such that the original RSS feed item may be referenced and analyzed. For example, information may be provided as part of the URL (e.g., as a parameter inserted as the URL in the feed is rewritten) that may be used as a key for a lookup in a database. This information may be the full content URL from the RSS item, or the even the RSS feed URL with the particular item identified.

As another example, the information provided as part of the URL may be an encoded version of the full content URL of the feed item that may then be decoded by the intervention service 114. For example, data may be maintained such as a table, usable by the intervention service to correlate the encoded version of the locator, to the hosted content, to the actual locator to the hosted content. As another example, all of the information to determine the actual locator to the hosted content may be present in the encoded version of the locator, obtainable by directly applying an appropriate decoding algorithm.

In fact, examples of processing of the intervention service being dynamically determined with respect to a particular activated RSS data item is not limited to correlating the RSS data item, for which content is requested, with material to be displayed. More generally, the intervention processing with respect to a particular RSS data item (or, more generally, to RSS data items having particular characteristics) may be dynamically determined by the intervention service 116. For example, the database of the intervention service 114 may include an indication of historical activity with respect to the particular activated RSS feed item, and the intervention processing may be determined based on the historical activity (e.g., an advertisement or other additional content to be displayed in conjunction with the feed-associated content may be determined based on the historical activity).

Figure 2:
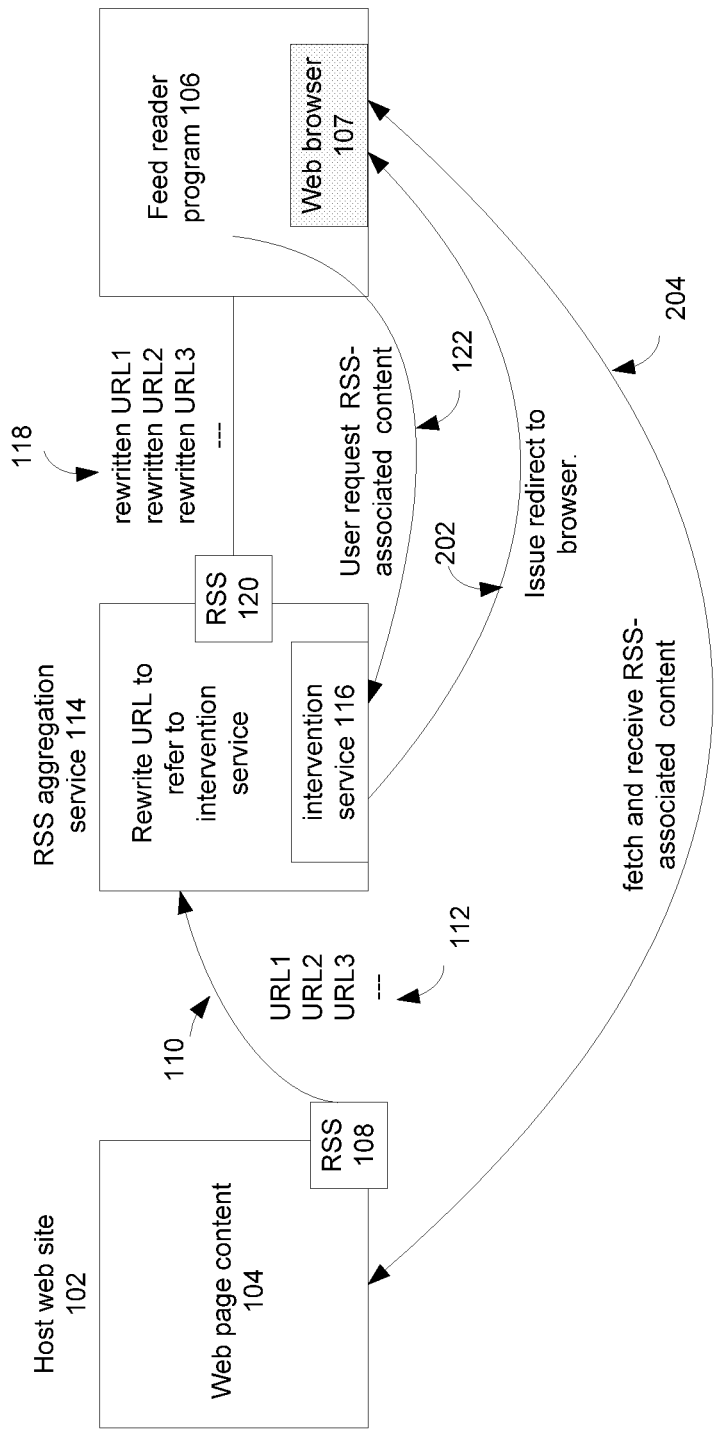
FIG. 2 example is similar to the FIG. 1 example. In the FIG. 2 example, the intervention service issues a browser redirect command to cause the user web browser to fetch and receive the requested content associated with the syndication data feed.

The FIG. 2 example is similar to the FIG. 1 example. In the FIG. 2 example, based on receiving a request for the content associated with an RSS feed, in addition to the providing and/or causing intervention operations, the intervention service 116 in the FIG. 2 example issues a browser redirect command to cause the web browser 106 to fetch and receive the requested content associated with an RSS feed. Like in the FIG. 1 example, due to the locator to the content associated with the RSS feed having been adjusted, the intervention service 116 has the opportunity to provide or cause intervention operations associated with the request for the content associated with the RSS feed.

Figure 3:
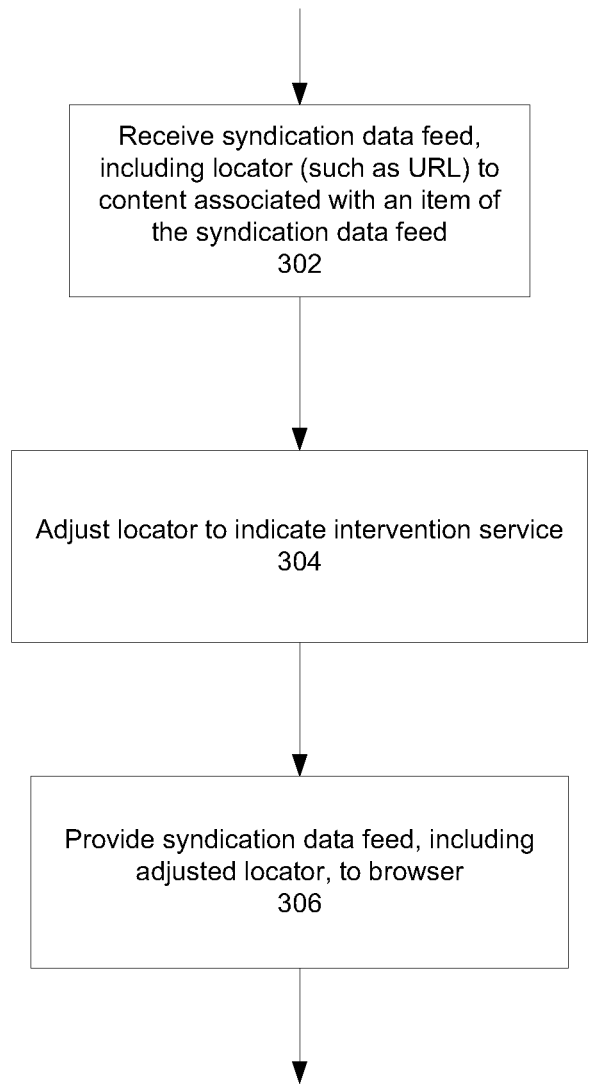
FIG. 3 is a flowchart illustrating processing steps that may be implemented to accomplish rewriting the locator of content associated with a syndication data feed.

FIG. 3 is a flowchart illustrating processing steps that may be implemented to accomplish rewriting the locator of content associated with an RSS or other syndication data feed. At step 302, a syndication data feed is received, including receiving a locator to content associated with an item of the syndication data feed. At step 304, the locator is adjusted to indicate the intervention service. At step 306, the syndication data feed, including the adjusted locator, is provided, such as to a user via a web browser.

In addition, an interface may be provided via which a moderator may create or otherwise cause metadata to be associated with a syndication feed item. For example, the moderator user interface may provide facility for the moderator to provide comments to be associated with a syndication feed item, or the moderator user interface may provide facility for the moderator to cause metadata not directly created by the moderator via the moderator user interface to be associated with a syndication data feed item. For example, the moderator user interface may provide facility for the moderator user to cause metadata from the del.icio.us "social bookmarking" site to be associated with a syndication data item.

Co-pending patent application Ser. No. 11/611,668, entitled MODERATED SYNDICATION DATA FEED, and filed concurrently herewith, provides details of adjusting feed items and operation of an intervention service. Co-pending patent application Ser. No. 11/611,668 is incorporated herein by reference in its entirety for all purposes.

Furthermore, upon activation of a feed item that results in a request for the content associated with the feed item, in addition, an indication of metadata associated with the syndication data feed item (such as metadata provided by the moderator or caused by the moderator to be associated with the syndication data feed item) may be caused by intervention processing to be displayed in conjunction with the feed-associated content.

Figure 4:
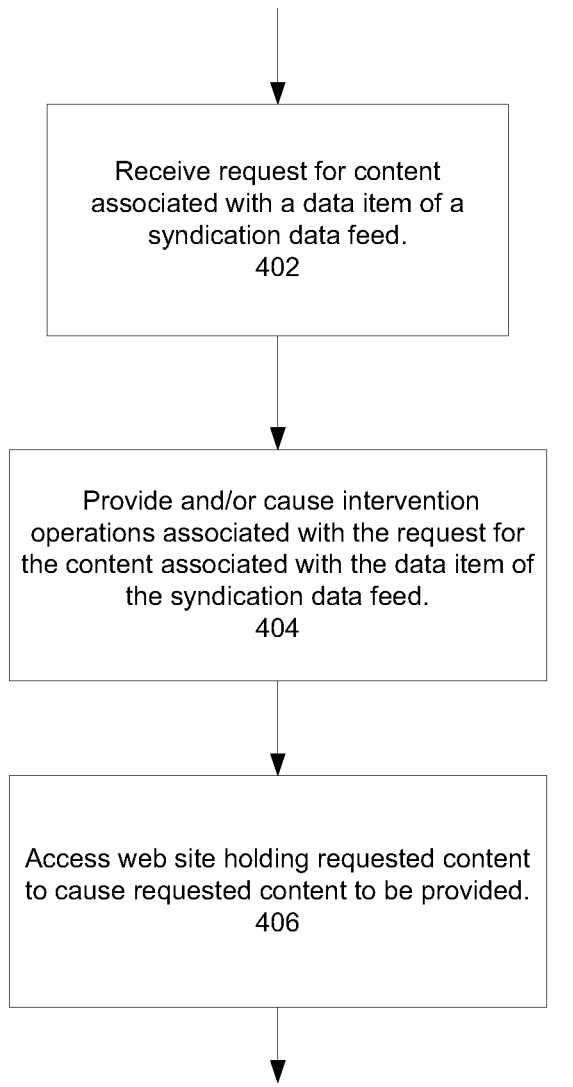
FIG. 4 is a flowchart illustrating processing steps that may be implemented to accomplish fulfilling a request for content associated with the RSS or other syndication data feed.

FIG. 4 is a flowchart illustrating processing steps that may be implemented to accomplish fulfilling a request for content associated with the RSS or other syndication data feed. At step 402, a request is received for content associated with a data item of a syndication data feed. At step 404, intervention operations associated with the request for the content associated with the data item of the syndication data feed are provided and/or caused. At step 406, the web site holding the requested content is accessed to cause requested content to be provided (e.g., to be displayed by a web browser program to the content requester).

We have described a method and system to perform intervention operations to observe and/or act upon a user activating a syndication feed data item. The intervention operations may be such as to monetize these activations or otherwise improve user experience.

What is claimed is:

1. A method comprising:

receiving a syndication feed from a content host at a syndication aggregator, wherein the syndication feed comprises a structured representation of content available from the content host, the structured representation comprising a plurality of uniform resource locators (URLs) corresponding to a plurality of syndication feed items available from the content host;

at the syndication aggregator, modifying the syndication feed such that a modified syndication feed is formed, wherein modifying the syndication feed includes modifying the plurality of URLs corresponding to the plurality syndication feed items such that each of the plurality of URLs is modified to include location information of an intervention service associated with the syndication aggregator;

from the syndication aggregator, sending the modified syndication feed to a syndication reader program that is configured to enable a user that has subscribed to the syndication feed to request the syndication feed items via the modified syndication feed's modified URLs;

receiving at the intervention service a notification of a request from the syndication reader program for content associated with a particular syndication feed item from the modified syndication feed;

at the intervention service, obtaining content corresponding to the particular syndication feed item from the content host; and providing from the intervention service the content obtained from the content host and additional content to the syndication reader program that is further configured to cause both the additional content and the content obtained from the content host to be displayed.

2. The method of claim 1, wherein the additional content is selected based at least in part on an identity of the requesting user.

3. The method of claim 1, wherein the additional content is determined-based at least in part on metadata associated with the syndication feed or the request.

4. The method of claim 3, wherein the additional content is determined based at least in part on analyzing previously determined metadata for previous requests for the particular syndication data feed item.

5. The method of claim 1, wherein the additional content is determined based at least in part on characteristics of the particular syndication data feed item.

6. The method of claim 5, wherein the additional content is determined based at least in part on obtaining a copy of the particular syndication data feed item for analysis based on information in the request from the syndication reader program.

7. The method of claim 1, wherein the additional content is determined based at least in part on one or more characteristics of the requesting user.

8. The method of claim 1, wherein the additional content further comprises content to be displayed to solicit and receive feedback from the requesting user regarding the particular syndication feed item.

9. The method of claim 1, further comprising at the intervention service monetizing the request to view the particular syndication feed item.

10. The method of claim 1, wherein the additional content is determined based at least in part on information collected as a result of prior processing by the intervention service with respect to previous requests for content associated with the particular syndication data feed item.

11. A computer program product comprising at least one computer-readable medium in a form that excludes transmission type media and having computer program instructions stored therein which, when executed by a processor at least one computing device, are operable to cause the at least one computing device to:
    receive a syndication feed from a content host at a syndication aggregator, wherein the syndication feed comprises a structured representation of content available from the content host, the structured representation comprising a plurality of uniform resource locators (URLs) corresponding to a plurality of syndication feed items available from the content host;
    at the syndication aggregator, modify the syndication feed such that a modified syndication feed is formed, wherein modifying the syndication feed includes modifying the plurality of URLs corresponding to the plurality of syndication feed items such that each of the plurality of URLs is modified to include location information of an intervention service associated with the syndication aggregator;
    from the syndication aggregator, send the modified syndication feed to a syndication reader program that is configured to enable a user that has subscribed to the syndication feed to request the syndication feed items via the modified syndication feed's modified URLs;
    receive at the intervention service a notification of a request from the syndication reader program for content associated with a particular syndication feed item from the modified syndication feed;
    at the intervention service, obtain content corresponding to the particular syndication feed item from the content host; and
    provide from the intervention service the content obtained from the content host and additional content to the syndication reader program that is further configured to cause both the additional content and the content obtained from the content host to be displayed.

12. The computer program product of claim 11, wherein the additional content is selected based at least in part on an identity of the requesting user.

13. The computer program product of claim 11, wherein the additional content is determined-based at least in part on metadata associated with the syndication feed or the request.

14. The computer program product of claim 13, wherein the additional content is determined based at least in part on analyzing previously determined metadata for previous requests for the particular syndication data feed item.

15. The computer program product of claim 11, wherein the additional content is determined based at least in part on characteristics of the particular syndication data feed item.

16. The computer program product of claim 15, wherein the additional content is determined based at least in part on obtaining a copy of the particular syndication data feed item for analysis based on information in the request from the syndication reader program.

17. The computer program product of claim 11, wherein the additional content is determined based at least in part on one or more characteristics of the requesting user.

18. The computer program product of claim 11 wherein the additional content further comprises content for soliciting and receiving feedback from the user regarding the particular syndication feed item.

19. The computer program product of claim 11, wherein the computer program instructions are further operable to cause at least one computing device to:
    monetize the request to view the particular syndication feed item.

20. The computer program product of claim 11, wherein the additional content is determined based at least in part on information collected as a result of prior processing by the intervention service with respect to previous requests for content associated with the particular syndication data feed item.

21. A computing system having at least one computing device with a processor configured to execute computer program instructions for:
    receiving a syndication feed from a content host at a syndication aggregator, wherein the syndication feed comprises a structured representation of content available from the content host, the structured representation comprising a plurality of uniform resource locators (URLs) corresponding to a plurality of syndication feed items available from the content host;
    at the syndication aggregator, modify the syndication feed such that a modified syndication feed is formed, wherein modifying the syndication feed includes modifying the plurality of URLs corresponding to the plurality of syndication feed items such that each of the plurality of URLs is modified to include location information of an intervention service associated with the syndication aggregator;
    from the syndication aggregator, sending the modified syndication feed to a syndication reader program that is configured to enable a user that has subscribed to the syndication feed to request the syndication feed items via the modified syndication feed's modified URLs;
    receiving at the intervention service a notification of a request from the syndication reader program for content associated with a particular syndication feed item from the modified syndication feed;
    at the intervention service, obtaining content corresponding to the particular syndication feed item from the content host; and providing from the intervention service the content obtained from the content host and additional content to the syndication reader program that is further configured to cause both the additional content and the content obtained from the content host to be displayed.

22. The computing system of claim 21, wherein the additional content is determined based at least in part on an identity of the requesting user.

23. The computing system of claim 21, wherein the additional content is determined based at least in part on information collected as a result of prior processing by the intervention service with respect to previous requests for content associated with the particular syndication data feed item.

24. The computing system of claim 21, wherein the additional content is determined based at least in part on metadata associated with the syndication feed or the request.

25. The computing system of claim 24, wherein the additional content is determined based at least in part on analyzing previously determined metadata for previous requests for the particular syndication data feed item.

26. The computing system of claim 21, wherein the additional content is determined based at least in part on characteristics of the particular syndication data feed item.

27. The computing system of claim 26, wherein the additional content is determined based at least in part on obtaining a copy of the particular syndication data feed item for analysis based on information in the request from the syndication reader program.

28. The computing system of claim 27, wherein the additional content is determined based at least in part on one or more characteristics of the requesting user.

29. The computing system of claim 21 wherein the processor is further configured to execute computer program instructions for:
  monetizing the request to view the particular syndication feed item.

30. The computer program product of claim 20, wherein the information collected as a result of the prior processing by the intervention service with respect to previous requests for content associated with the particular syndication feed item pertains to a plurality of users that initiated the previous requests for content associated with the particular syndication feed item.

31. The computing system of claim 23, wherein the of previous requests for content associated with the particular syndication data feed item were initiated by a plurality of users.

32. The method of claim 1, wherein the additional content comprises an advertisement.

33. The method of claim 1, wherein the location information of the intervention service comprises a URL of the intervention service.

34. The method of claim 33, wherein each of the modified URLs further comprises a parameter to be provided to the intervention service, the parameter identifying a syndication feed item.

35. The method of claim 34, wherein the parameter comprises a URL corresponding to the syndication feed item.

36. The method of claim 33, wherein each of the modified URLs further comprises an encoded parameter to be provided to the intervention service, the parameter identifying a syndication feed item, the method further comprising:
  at the intervention service, decoding the encoded parameter identifying the particular syndication feed item for which the content is requested.

37. The method of claim 36, wherein encoding of the parameters is performed at the syndication aggregator.

38. The method of claim 1, further comprising:
  performing intervention processing at the intervention service, wherein the intervention processing includes tracking requests for hosted content based on syndication feed items, collecting information pertaining to the requests, and selecting the additional content based, at least in part, on at least a portion of the collected information.

39. The method of claim 1, wherein the request comprises the modified URL associated with the particular syndication feed item.

* * * * *